United States Patent [19]
Hagerty et al.

[11] Patent Number: 4,929,065
[45] Date of Patent: May 29, 1990

[54] GLASS PLATE FUSION FOR MACRO-GRADIENT REFRACTIVE INDEX MATERIALS

[75] Inventors: James J. Hagerty, Saratoga; David N. Pulsifer, Mountain View, both of Calif.

[73] Assignee: ISOTEC Partners, Ltd., Tucson, Ariz.

[21] Appl. No.: 266,670

[22] Filed: Nov. 3, 1988

[51] Int. Cl.⁵ .............................................. G02B 5/00
[52] U.S. Cl. .................................................. 350/413
[58] Field of Search ........................ 350/413, 320, 417

[56] References Cited

U.S. PATENT DOCUMENTS

| | | | |
|---|---|---|---|
| 1,943,521 | 1/1934 | Ewald | 350/413 |
| 2,216,965 | 10/1940 | Sukumlyn | 350/413 |

*Primary Examiner*—Rodney B. Bovernick
*Assistant Examiner*—Rebecca D. Gass
*Attorney, Agent, or Firm*—Ashen Golant Martin & Seldon

[57] ABSTRACT

A glass block (10) comprises a plurality of intermediate glass plates (12*i*) stacked between a top plate (12*t*) and a bottom plate (12*b*). The top and bottom plate each have a selected composition, with a particular index of refraction and a softening temperature. The intermediate plates have compositions intermediate those of the top and bottom plates and are stacked so as to provide a gradient in composition from top to bottom. Heating the assembly at a fusion temperature fuses the plates together to form the glass block. After cooling down to room temperature, the glass block can be shaped to make lenses and other light directing devices. Such lenses have a gradient in the refractive index of at least about 0.085, and gradients approaching 0.5 are achievable. The thickness of the glass block along the optic axis is fairly unlimited, and thicknesses on the order of 10 mm and more are routinely achievable by the process of the invention.

16 Claims, 2 Drawing Sheets

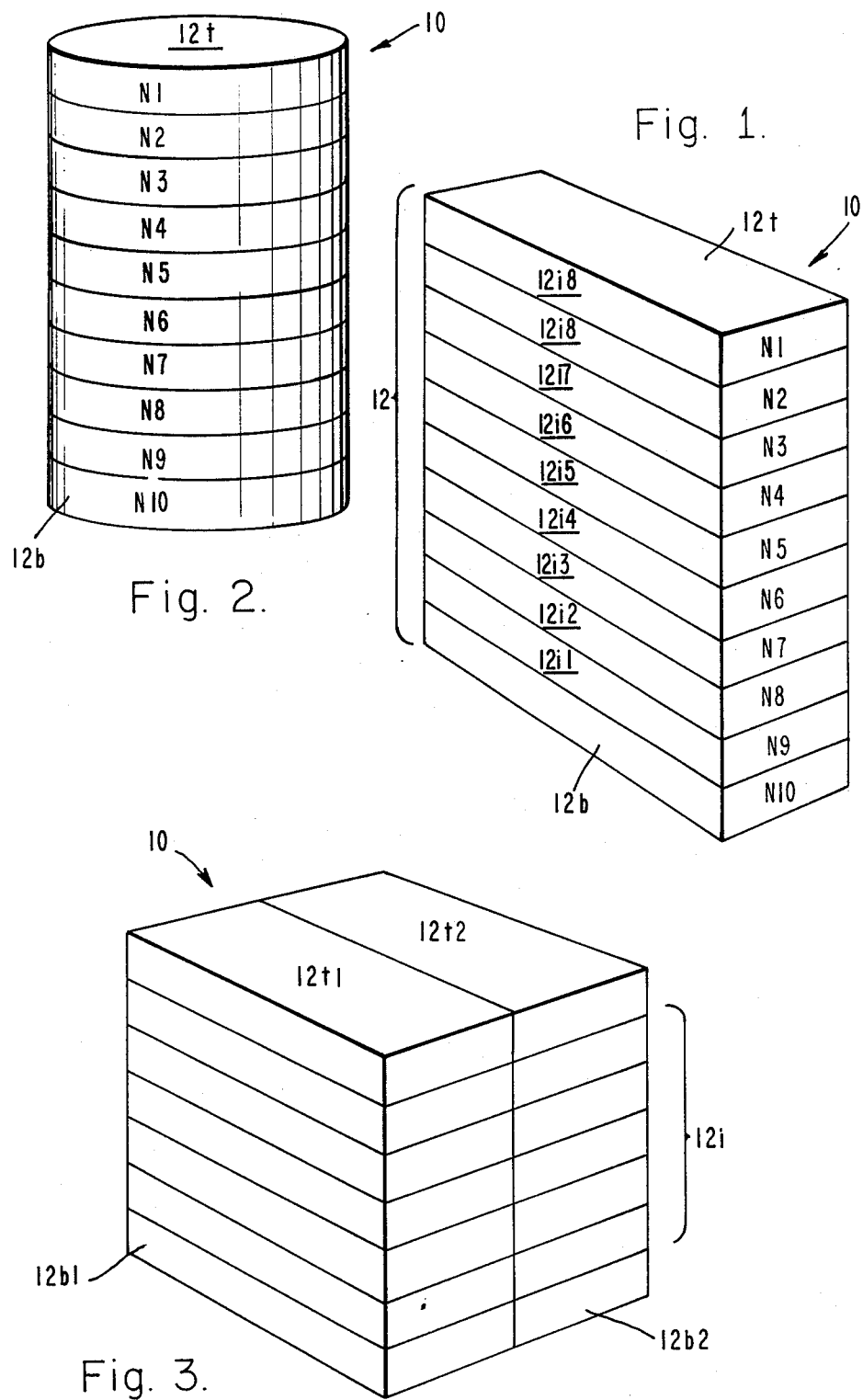

GLASS PLATE FUSION FOR MACRO-GRADIENT REFRACTIVE INDEX MATERIALS

TECHNICAL FIELD

The present invention relates generally to devices for directing radiant energy, such as lenses, and more particularly, to optically refractive glasses having a gradient in the index of refraction in at least one dimension.

BACKGROUND ART

Radial refractive optical gradients have been generated in samples of plastic and glass. In U.S. Pat. No. 3,718,383 for "Plastic Optical Element Having Refractive Index Gradient", issued to Robert S. Moore on Feb. 27, 1973, the inventor describes the diffusion of a diluent into a shaped polymeric matrix to form a continuous gradient in refractive index in a direction perpendicular to the optical axis thereof. The diluent and the polymeric material have different refractive indices. In cylindrical samples, an angularly symmetric, radial gradient of refractive index substantially proportional to the radial distance perpendicular to the optical axis may be formed by diffusion of a diluent having lower index of refraction than the plastic matrix material into the matrix from the central core thereof. Similarly, for positive lenses, where the refractive index must decrease in the outward radial direction, inward diffusion of a diluent external to a plastic rod is required.

In U.S. Pat. No. 3,859,103 for "Optical Glass Body Having A Refractive Index Gradient", issued to Mitsugi Yoshiyagawa on Jan. 7, 1975, the inventor describes the production of a continuously decreasing index of refraction from the central axis of a glass object to the peripheral surface thereof as a result of the substitution of thallium ions contained in the glass by external alkali metal ions. Glass containing $Tl_2O$ was chosen since the thallium ions give the glass a high refractive index. The process for achieving the required substitution of ions is to bring the glass article into contact with a chosen molten salt for a period of time sufficient for significant diffusion to take place. A distribution of the refractive indices according to the relationship $N=N_O(1-ar^2)$ was generated in a glass rod, where r is the distance from the center in the radial direction, a is a positive constant, and $N_O$ is the refractive index at the center of a cross section of the glass body perpendicular to the central axis thereof.

In U.S. Pat. No. 4,053,204, "Optical Fiber Having Reduced Dispersion", issued to Stewart E. Miller on Oct. 11, 1977, and in U.S. Pat. No. 4,076,380, "Graded Index Optical Fiber", issued to Frank Vincent DiMarcello and John Charles Williams on Feb. 28, 1978, the inventors disclose graded refractive index optical fibers having radial gradients in repetitively varying discrete longitudinal zones for improving the dispersion characteristics of light pulses traveling therethrough. In the former patent, the zones are achieved by varying the thickness of each layer of constant optical index material, while in the latter patent, layers of different index of refraction are disposed in a helical pattern along the length of the fiber. Chemical vapor deposition techniques are used to form the layers in both devices.

In U.S. Pat. No. 4,696,552, "Projection Device with Refractive Index Distribution Type Lens", issued to Jun Hattori and Shigeyuki Suda on Sept. 29, 1987, the inventors disclose a projection device having an illuminating system for illuminating an object, and an index distribution type lens for projecting the image of the object. The lens has a refractive index distribution substantially proportional to the square of the distance from the optic axis in a cross-section perpendicular to the optic axis and a refractive index distribution monotonously varying in the direction of the optic axis. The lens is characterized by dimensions of about 18 mm in length and 0.5 mm in diameter (perpendicular to the optic axis) and a change in refractive index of less than 0.05.

For the purpose of the present specification, we define the term "optical axis" to mean an imaginary straight line which extends internally through the refractive material of the subject invention and which passes through both the entrance and exit surfaces of this material which are adapted for the passage of light. Although there may be more than one optical axis for a chosen embodiment of the invention, in general, the optical axis will be uniquely defined by the geometrical symmetry of the material. In either event, changes in the index of refraction of the refractive material will be defined relative to the optical axis. Also for the purpose of the present specification, we define the term "bidirectional gradient" to refer to a gradient in the index of refraction that occurs along each of two directions, usually mutually orthogonal. Finally, "light" is defined as that electromagnetic radiation in the frequency spectrum ranging from infra-red through visible to ultraviolet.

Notably absent from the patent literature and from the science and engineering literature is a description of monotonically varying distributions of optical densities with significant change in index of refraction and over significant dimension in the axial direction. While Hattori et al, supra, disclose lenses having bi-directional gradient varying indices of refraction, such lenses have no substantial thickness, as the term is used herein, and no significant change in index of refraction, as the term is used herein.

Recent advances in fabricating macro-gradient optical density transmissive light concentrators, lenses and compound lenses of large geometry have been disclosed in Ser. No. 07/206,109 now Pat. No. 4,883,522 and 07/206,110, both filed June 17, 1988, and assigned to the same assignee as the present application. These applications disclose the use of glass powders, or frits, to fabricate the optical elements; a series of frit mixtures, ranging from a first composition to a second composition in small steps, e.g., 10% change per layer of frit, are placed in a crucible and melted.

The optical elements derived from the frit process are suitable for the purposes intended. Nevertheless, advances in processing techniques are required in order to provide improved optical elements.

DISCLOSURE OF INVENTION

In accordance with the invention, optical elements comprising fused glass members are provided, along with a process of preparing the same. In the process, a plurality of glass plates are stacked and fused together. The stack comprises a top plate of one glass composition and a bottom plate of another glass composition. Intermediate plates comprise a homogeneous mixture of the two glasses. The two end members are selected on the basis of a desired change in refractive index, similar thermal coefficient of expansion, and softening temperature.

After fusion, the composite glass block is brought down to room temperature by an annealing process to minimize the effects of any thermal stresses. The block may then be shaped to form lenses and other optical elements.

The process of the invention requires less time and is performed under less onerous conditions than prior art processes such as vapor phase diffusion and molten salt diffusion. Further, large geometry blocks, with a thickness along the optic axis of 10 mm and larger are easily prepared. Additionally, macro-gradients in the index of refraction, on the order of 0.1, and even approaching 0.5, along the optic axis are achievable.

BRIEF DESCRIPTION OF THE DRAWINGS

FIG. 1 is a perspective view of a plurality of glass blocks, having a rectilinear shape, stacked prior to fusion;

FIG. 2 is a perspective view of a plurality of glass blocks, having a disk shape, stacked prior to fusion;

FIG. 3 is a perspective view of a plurality of glass blocks as in FIG. 1, but showing lateral positioning to form larger blocks, prior to fusion;

BEST MODES FOR CARRYING OUT THE INVENTION

Figure 4:
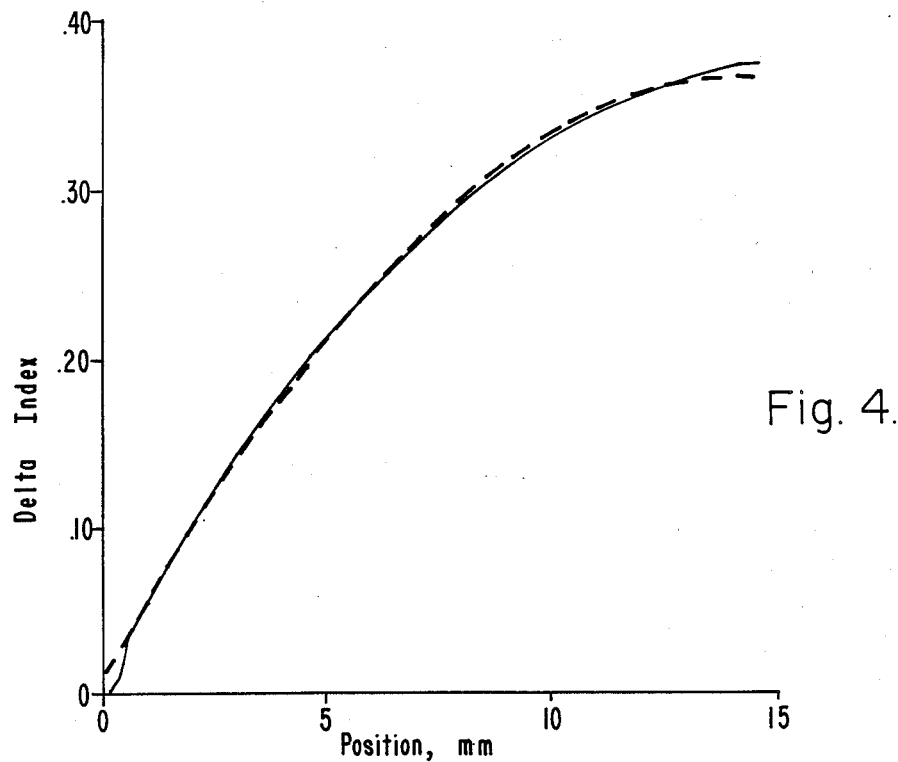
FIG. 4, on coordinates of $\Delta n$ and position, is a plot of actual change in index of refraction with distance through a fused glass stack and calculated according to a polynomial equation.

Referring now to the drawings wherein like numerals refer to like elements throughout, a stack 10 of plates 12 is shown in FIG. 1, prior to fusion. In the practice of the invention, a plurality of plates is employed. While the number of plates is not critical to the process, it appears that at least five plates must be employed in order to realize the benefits of the invention. Fewer plates may not provide the large changes in index of refraction in a controllable fashion.

While in theory as many plates as desired may be used, considerations such as furnace dimensions, subsequent processing capabilities such as secondary drawing and rolling, required time and temperature conditions for fusion of adjacent plates, final fused block dimension, desired change in index of refraction ($\Delta n$), and initial plate thickness all are factors in dictating the most economical number of plates to use. In general, best results to date have been achieved with from five to eight plates.

The thickness of the individual plates 12 may be tailored as desired to accomplish a particular finished fused block 10. For example, individual plates, each 3 mm thick, may be used to form a block 24 mm thick.

Practical plate thicknesses of at least about 1 mm are useful for ease of fabrication. Plate thickness is selected at least in part based on diffusion rates between adjacent plates. The preferred plate thickness ranges from about 1.8 to 3 mm.

The size of the block depends on the desired end thickness and on fabrication techniques, but in theory could be several centimeters thick, limited only by the ability to produce such a thick block in a stress-free condition.

The desired range of index of refraction is selected, and the two end members, each having a particular index of refraction, are selected to give the desired refractive index change. The end members are denoted in FIG. 1 as 12b (for bottom) and 12t (for top).

Intermediate plate members 12i1, 12i2, etc., may be prepared by mixing powders of the end members in desired proportions to obtain a desired index change between adjacent plates. For example, where the desired $\Delta n$ is 0.46 and the total number of vertically stacked plates is 8, then each plate varies by about 0.066. Again, for example, in an 8 plate block, 12i1 comprises 12.5% of the composition of plate 12b and 87.5% of the composition of plate 12t. The composition of other intermediate plate members are accordingly determined.

Plates may be fabricated from frits or powders, ranging in size from about 325 mesh ($<44$ $\mu$m) to 1.6 mm. The frits or powders are then mixed in a rotary tumbler to insure random dispersion of one glass composition in the other.

The frit or powder of the desired composition is placed in a mold or crucible and heated to an elevated temperature. This elevated temperature depends on several factors, including the relative chemical differences between the two glasses, the mold or crucible materials (for example, platinum discolors lead-bearing glasses at 1,500° C.), the presence of elements with a high vapor pressure (such as lead) which can cause injury to personnel or equipment, the possible formation of phase-separated glasses, and whether stirring is required.

In general, heating is done to some temperature above fusion temperature of the component glass having the highest fusion temperature, consistent with the foregoing factors. The temperature is maintained at that point until the plate is free of bubbles, typically from about 2 to 6 hrs. Plates can then be annealed to reduce the possibility of breakage during subsequent processing. The heating may be done under atmospheric conditions. Alternatively, the heating may be done in vacuum to aid in the removal of bubbles.

Finally, other methods of making plates include placing bulk portions of the base glasses in a high purity crucible of platinum, alumina, or silica, and allowing blending to occur by normal convective currents or by stirring. When the mixture is free of compositional inhomogeneities and bubbles, the molten glass is poured onto a heated plate or into a mold of brass or iron. The resulting glass may be in the shape of a block or slab which can then be sawed to the appropriate plate dimensions. Again, the plate or block can be annealed to prevent breakage prior to fusion. Such techniques are well-known in the glass industry.

Several other current glass-making techniques for fabricating large quantities of plate glass may also be employed, such as the float process, vertical drawing, and the overflow method.

The plates 12 are stacked in the desired configuration. Owing to the effects of gravity, the densest glass is placed on the bottom, with decreasing density toward the top of the stack 10. On the other hand, by matching densities of glasses, complex profiles of refractive index may be created.

The plates 12 may be stacked in a mold (not shown) which enables the stack 10 to retain its shape during fusion. However, the mold may be eliminated so long as some means of restriction is present during fusion to prevent collapse of the stack/block. Mold compositions include those substantially inert with respect to the glass; examples include Pt and 95% Pt-5% Au, as well as the typical ceramics, such as alumina.

While there may be a range of softening temperatures in the stack, depending on individual plate composition, it is preferred to select end member glasses of about the same softening temperature. Use of compositions with similar softening temperatures renders fusion and annealing easier. For example, the glass plates are about the same viscosity at a given temperature, which ensures better control over diffusion of species.

It will be appreciated that various shapes other than rectilinear, depicted in FIG. 1, may be employed. For example, disk-shaped glasses, shown in FIG. 2, may be used, following the same considerations given above. Further, plates may be fused laterally, as well as vertically, as depicted in FIG. 3. The plates at each level generally have the same composition, although the invention is not limited to such a configuration.

The desired stack 10 is placed in a furnace and heated for a period of time. There are several considerations that dictate the particular time-temperature profile employed. For example, some glasses may be placed in the furnace at room temperature and brought to the fusion temperature over a period of hours. Glasses prone to devitrification, however, may have to reach the fusion temperature in a few minutes. This ensures that crystal nucleation and growth are minimized, but may require using a furnace that has been preheated to the fusion temperature.

If the individual plates 12 have been previously annealed, the stack 10 can be placed directly into the furnace at the fusion temperature with no adverse effects. If the plates have not been annealed, however, they may fracture, causing air to enter the stack, which will necessitate a longer fusion time and which may disrupt the gradient profile.

A vacuum-assisted pre-heat step may be used to remove air trapped between layers and to reduce the thermal shock at the fusion temperature. Pre-heat temperatures need to be above the highest softening temperature by approximately 200° C. and vacuum levels between 20 and 25 inches of mercury. If the plate surfaces are very smooth, however, the use of vacuum seems to have a minimal effect.

If there are bubbles within a particular plate or plates 12, the fused block 10 may be assembled by sequentially melting one layer at a time, starting with the bottom layer. This method allows bubbles to rise to the surface without passing through a layer of different index, thereby maintaining control of the index location more precisely.

The time of fusion is dependent upon several factors, including the chemical differences between any two adjacent plates, the thickness of the plates, the temperature constraints of the glasses for either phase separation or devitrification, and the mold material. Fusion times between about 1.5 and 8 hours seem sufficient.

The fusion temperature must be sufficiently high so that the viscosity of each of the constituent plates 12 in the stack 10 is sufficiently low. In general, the preferred fusion temperature is approximately twice the maximum softening temperature. During the fusion process, a stable diffusion of constituents takes place over a limited distance so that the resultant index is a smooth function of position.

Following fusion, the fused block 10 must be brought down to room temperature without cracking. This is accomplished by an annealing sequence. Many routes may be taken, and the person skilled in the art can, based on the teachings herein together with knowledge of glass annealing in general, develop an optimum route for a particular combination of glass compositions. In general, the annealing temperature must be below the maximum softening temperature among the constituent plate compositions, and must also take into account the mold or processing materials, the basic constituents of the glass, and their interactions. For optical glasses, these considerations are important, in order to avoid discoloration due to reaction of a glass component with the mold, for example. The annealing process typically takes from about 15 to 60 hours.

The fused block 10 may then be shaped and polished, using well-known techniques. The finished block may be shaped as a lens, for example, or other light directing device. It will be appreciated that lenses of large geometry, with the index of refraction varying along the entire optic axis, may be fabricated in accordance with the teachings of this invention.

The change in index of refraction may be made quite substantial; a $\Delta n$ of at least about 0.085 is routinely achieved with the teachings of the invention, without resorting to the problems associated with molten salt processes or without requiring the extensive processing times associated with vapor phase diffusion processes. Changes in the index of refraction approaching 0.5, unavailable with the prior art techniques, particularly for the large geometries obtainable herein, are also achievable with the process of the invention. Presently, optical glasses with $\Delta n$ ranging from about 0.085 to 0.1 are readily prepared.

The process of the invention is not limited to particular types of glasses. So long as the two end members do not form two phases during heating, many pairs of end member glasses may be employed. For example, lead borate glasses may be combined with sodium borate glasses, potash barium lead glasses may be combined with potash borosilicate glasses, and alumino-borosilicate glasses may be combined with potash soda lead glasses. The last two pairs of glass types have representative compositions which produce optical quality glass.

INDUSTRIAL APPLICABILITY

Fused glass plates prepared in accordance with the invention are expected to find use as lenses and other related applications where large $\Delta n$ of 0.085 and greater are required and where large thicknesses along the optic axis are desired.

EXAMPLES

Example 1

In this example, the index of refraction was chosen so as to vary in a predominantly quadratic fashion along the optic axis.

Sixteen glass plates, each measuring 102 mm×38 mm×3 mm, were arranged in a Pt-Au mold to form a stack having dimensions 204 mm×38 mm×24 mm. The bottom layer comprised a commercially available, lead borate glass (Specialty Glass, Inc., Oldsmar, FL; SP457), which was found by analysis to comprise 82.5 wt % PbO, 11.5 wt % $B_2O_3$, 3.0 wt % $Al_2O_3$, 1.0 wt % CaO; $SiO_2$, $Na_2O$, $K_2O$ < 1 wt %. and had a refractive index of 1.97. This glass had a density of 6.2 g/cm³, thermal coefficient of expansion of 104×10⁻⁷ cm/cm/°C., and softening temperature of 370° C.

The top layer comprised a commercially available sodium borosilicate glass (Speciality Glass, Inc.; SP712), which was found by analysis to comprise 46.0 wt % $SiO_2$, 16.0 wt % $B_2O_3$, 14.0 wt % $Na_2O$, 14.0 wt % $Al_2O_3$, 5.0 wt % $K_2O$; PbO, CaO<1 wt % and had a refractive index of 1.51. This glass had a density of 2.4 g/cm³, a thermal coefficient of expansion of 97×10⁻⁷ cm/cm/°C., and a softening temperature of 628° C.

The average change in the index of refraction of each layer was approximately 0.066. The precise values of the set of indices of the plates were chosen so that the final resultant profile achieved the desired quadratic gradient profile.

The intermediate layers were prepared by casting plates of an appropriately chosen mixture of powders of the above glass compositions. The mixtures were chosen so that the resultant compositions had the required intermediate refractive indices.

The stack was heated to and kept at 1000° C. for 6 hrs. to fuse the constituent plates together. Following fusion, the resulting block was annealed by ramping down to below the softening temperature of the low index glass (here, to 500° C.) over a period of time of about 15 hrs., holding at that temperature for 3 hrs., then ramping down to the annealing temperature of the high index glass (here, to 335° C.) over a period of time of about 25 hrs., holding at that temperature for about 2 hrs., then ramping down to 275° C. (the lowest strain point of the constituent glasses) over a period of time of about 2 hrs., and finally ramping down to room temperature by shutting off the furnace (about 10 to 12 hrs.).

After polishing, the block evidenced an axially graded index of refraction, in which the index of refraction changed along the optic axis, from bottom to top. In order to measure the index of refraction profile, a vertical slice was taken of the cross-section and optically polished. Conventional interferometric techniques were used to measure the index of refraction as a function of vertical position. The results showed a smoothly changing index of refraction which could be fit by a simple polynomial which is directly suitable for use in well-known lens design computer programs. The desired predominantly quadratic profile was found to fit the following equation:

$$\Delta n = 0.00731711 + 0.0484803x - 0.00162745x^2$$

where x is the distance from the top of the sample, at a wavelength of 0.6328 μm. The plotted curve is shown in FIG. 4, where the solid line represents the actual measured data, while the dashed line represents the calculated values from the above equation.

Example 2

In this example, the index of refraction was chosen so as to vary in a predominantly linear fashion along the optic axis.

Four glass plates, each measuring 51 mm×51 mm×2 mm and one glass plate measuring 51 mm×51 mm×6 mm were arranged in a Pt-Au mold to form a stack having dimensions 51 mm×51 mm×14 mm. Each plate was cast from appropriate powder mixtures of the two basic constituents used in Example 1. The index range was from 1.66 to 1.56 and the corresponding density range was from 3.64 to 2.83 g/cm³. The difference in refractive index between adjacent layers was a constant 0.025, leading to the desired linear gradient profile.

The stack was heated to and kept at 1040° C. for 8 hrs. to fuse the constituent plates together. Following fusion, the resulting block was annealed by ramping down to 600° C. in 8 hrs. and held there for 4 hrs. A 2 hr. ramp down to 500° C. with a 3 hr. hold, a 10 hr. ramp to 450° C. with a 3 hr. hold, and finally shutting off the furnace and cooling to room temperature in about 11 hrs. completed the annealing process.

Figure 5:
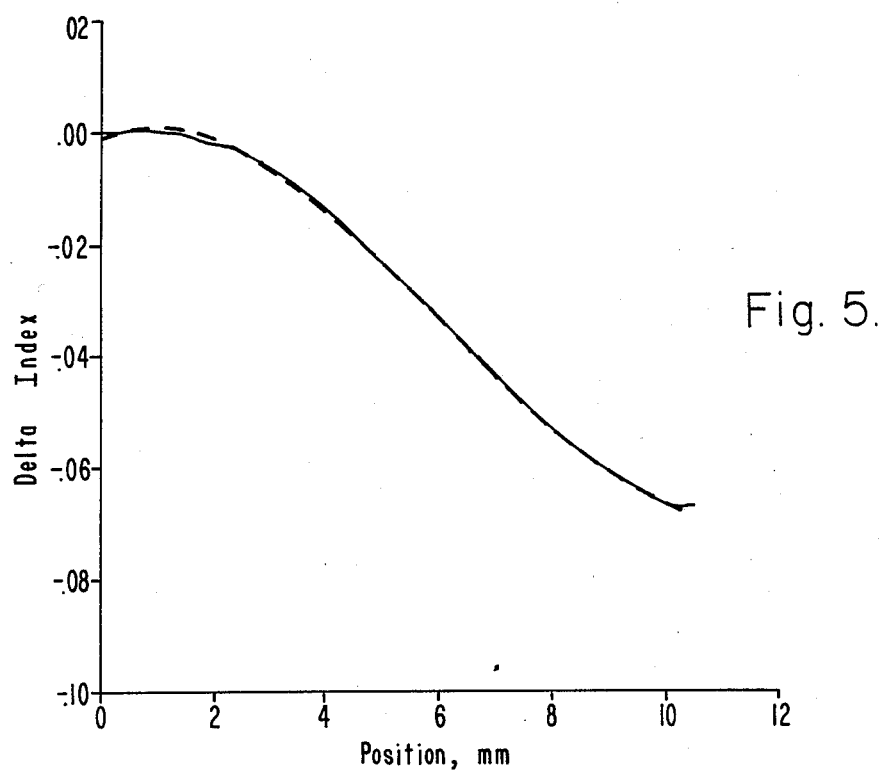
FIG. 5, on coordinates of $\Delta n$ and position, is a plot of actual change in index of refraction with distance through another fused glass stack and calculated according to a polynomial equation.

After polishing and trimming, the block evidenced an axially graded index of refraction. The index profile was measured as in Example 1. The results again showed a smoothly varying index of refraction, with Δn=0.0869. The desired predominantly linear profile was found to fit the following equation:

$$\Delta n = -0.0011071 + 0.002424942x - 0.00238295x^2 + 0.000130375x^3$$

where x is the distance from the bottom of the sample, at a wavelength of 0.6328 μm. The plotted curve is shown in FIG. 5, where the solid line represents the actual measured data, while the dashed line represents the calculated values from the above equation.

Example 3

In this example, the index of refraction was chosen to produce a linear gradient. Five layers, each 25 mm×25 mm×3 mm, were arranged in a Pt-Au mold to form a stack measuring 25 mm×25 mm×15 mm.

The bottom layer comprised a potash barium lead glass, available under the trade designation BaF4 from Schott Glass Technologies, Inc. (Duryea, PA). According to a Schott Material Safety Data Sheet, such glasses have a composition given by 21–50% silica, 21–50% lead oxide, 11–20% barium oxide, 1–10% potassium oxide, 1–10% zinc oxide, <1% sodium oxide, <1% arsenic trioxide. This glass had a refractive index of 1.6056, a coefficient of expansion of 88×10⁻⁷ cm/cm/°C., a density of 3.5 g/cm³, and a softening temperature of 694° C.

The top layer comprised a potash borosilicate, available under the trade designation K7 from Schott Glass Technologies, Inc. (Duryea, PA). According to a Schott Material Safety Data Sheet, such glasses have a composition given by >51% silica, 11–20% potassium oxide, 1–10% boron oxide, 1–10% sodium oxide, 1–10% zinc oxide, <1% lead oxide, titanium oxide, and arsenic trioxide. This glass had a refractive index of 1.5111, a coefficient of expansion of 97×10⁻⁷ cm/cm/°C., a density of 2.54 g/cm³, and a softening temperature of 712° C.

The index of refraction of each layer changed by about 0.027, leading to the desired linear gradient profile. Intermediate plates were cast from appropriately chosen mixtures of powders. The powders were prepared from solid blocks of the two base glasses.

The plates were prepared by heating at 1400° C. for 2 hrs, then rapidly cooling to 500° C., where they were held for 6 hrs in order to completely anneal. The plate mixtures were chosen so that the resulting homogeneous mixture had the required intermediate refractive index.

The stack was assembled by sequentially melting each layer, beginning with the bottom layer. The stack was preheated at 960° C. for ½ hr, and then placed into the fusing furnace at 1400° C. for 8 hrs. The resulting fused block was taken from the fusing furnace and allowed to cool to room temperature in about 25 min. The block was then heated to 500° C. in 2 hrs and then maintained at that temperature for 6 hrs in order to anneal. The block was then cooled to 300° C. over 2 hrs and then allowed to cool to room temperature over about 6 hrs.

After polishing, the resulting block evidenced an axially graded index of refraction, in which the index of refraction changed along the optic axis from top to bottom. The index of refraction appeared to change smoothly as a function of position and in such a way as to evidence a predominantly linear profile.

Additional Work

Glass blocks similar to the above have been prepared with six, seven, and eight layers. Examples of changes in index of refraction included 0.1, 0.2, and 0.46. The annealing schedules were scaled proportional to the mass of the block. In each case, a smoothly varying index of refraction is observed.

What is claimed is:

1. A process for fabricating a glass member having a varying index of refraction along an optic axis comprising
   (a) stacking a plurality of intermediate glass plates between a top plate and a bottom plate to form an assembly, said top plate comprising a glass of a first composition having a first selected index of refraction and a first softening temperature and said bottom plate comprising a glass of a second composition having a second selected index of refraction and a second softening temperature, said plurality of intermediate glass plates each comprising a composition intermediate that of said top and bottom plates and stacked to achieve a change in composition varying from said first composition to said second composition;
   (b) heating said assembly to a fusion temperature to fuse said plates to form a fused assembly; and
   (c) cooling said fused assembly to room temperature.

2. The process of claim 1, wherein said first softening temperature and second softening temperature are about the same.

3. The process of claim 1 wherein said glass plates are restricted from flowing during fusion.

4. The process of claim 3 wherein said glass plates are stacked in a mold comprising a material which is substantially inert with respect to the composition of said glass plates at said fusion temperature.

5. The process of claim 1 wherein from five to eight glass plates are vertically stacked.

6. The process of claim 1, including stacking plates laterally.

7. The process of claim 6 wherein said lateral plates all have the same composition at a given level.

8. The process of claim 1 wherein each glass plate ranges from about 1.8 to 3.0 mm thick.

9. The process of claim 1 wherein said index of refraction varies by at least about 0.085 along said optic axis.

10. The process of claim 1 wherein said glass member has a thickness of at least about 10 mm along said optic axis.

11. The process of claim 1 wherein said fusion temperature is approximately twice the maximum softening temperature of any glass plate of said assembly.

12. The process of claim 11 wherein said heating of said assembly is maintained at said fusion temperature for a time ranging from about 1.5 to 8 hours.

13. The process of claim 1 wherein said cooling said fused assembly includes annealing said assembly at a temperature below the maximum softening temperature of any glass plate of said assembly.

14. The process of claim 11 wherein said cooling takes a period of time ranging from about 15 to 60 hours.

15. A fused glass block having an optic axis and a smoothly varying refractive index providing a change in index of refraction of at least about 0.085 along said optic axis.

16. The fused glass block of claim 15 wherein said glass member has a thickness of at least about 10 mm along said optic axis.

* * * * *